(12) United States Patent
Oda et al.

(10) Patent No.: US 6,758,877 B2
(45) Date of Patent: Jul. 6, 2004

(54) FILTER AND METHOD FOR MANUFACTURING THE FILTER

(75) Inventors: Kouichi Oda, Kariya (JP); Tomohide Nishino, Kariya (JP)

(73) Assignee: Toyoda Boshoku Corporation, Kariya (JP)

( * ) Notice: Subject to any disclaimer, the term of this patent is extended or adjusted under 35 U.S.C. 154(b) by 55 days.

(21) Appl. No.: 10/080,693

(22) Filed: Feb. 25, 2002

(65) Prior Publication Data

US 2002/0129587 A1 Sep. 19, 2002

(30) Foreign Application Priority Data

Mar. 13, 2001 (JP) ........................................ 2001-071209

(51) Int. Cl.⁷ .............................................. B01D 46/00
(52) U.S. Cl. ............................. 55/495; 55/499; 55/500; 55/502; 55/514; 55/521; 55/527; 55/528; 55/DIG. 5; 55/DIG. 31; 264/5; 264/6; 264/13; 264/112; 264/257; 264/DIG. 48; 156/62.2; 156/73.1; 156/73.5; 156/245; 156/308.4
(58) Field of Search .................. 55/486, 487, 492, 55/495, 497, 499, 500, 502, 514, 521, 527, DIG. 5, DIG. 31, 528; 264/5, 6, 8, 13, 112, 151.13, 251, 255, 257, DIG. 48; 156/62.4, 73.1, 73.5, 73.6, 60, 62.2, 167, 242, 245, 308.4; 427/180, 244

(56) References Cited

U.S. PATENT DOCUMENTS

| | | | |
|---|---|---|---|
| 4,004,899 A | * | 1/1977 | Giacovas ...................... 55/499 |
| 4,069,026 A | * | 1/1978 | Simm et al. .................... 95/63 |
| 4,177,312 A | | 12/1979 | Rasen et al. |
| 4,181,514 A | * | 1/1980 | Lefkowitz et al. ........ 55/DIG. 5 |
| 5,512,172 A | | 4/1996 | Marble |
| 6,048,489 A | | 4/2000 | Reiter et al. |
| 6,156,089 A | * | 12/2000 | Stemmer et al. .............. 55/486 |
| 6,165,240 A | | 12/2000 | Hodge |
| 6,454,827 B2 | * | 9/2002 | Takagaki et al. .............. 55/492 |
| 2002/0095920 A1 | * | 7/2002 | Takagaki ...................... 55/502 |
| 2002/0132544 A1 | * | 9/2002 | Takagaki ...................... 442/381 |

FOREIGN PATENT DOCUMENTS

| | | |
|---|---|---|
| EP | 0 605 015 A1 | 7/1994 |
| EP | 1 149 620 A2 | 10/2001 |
| JP | 8-38834 * | 2/1996 ........... B01D/39/00 |

OTHER PUBLICATIONS

U.S. patent application Ser. No. 09/842,708, Takagaki et al., filed Apr. 27, 2001.

* cited by examiner

Primary Examiner—Duane Smith
Assistant Examiner—Jason M. Greene
(74) Attorney, Agent, or Firm—Oliff & Berridge, PLC

(57) ABSTRACT

A filter and a method of manufacturing the filter which is formed by spinning a fiber in a semi-molten state onto a mold such that the mold is provided as a filter structural member. The method obviates the need to remove the filter from the mold and thus simplifies the manufacture of the filter.

12 Claims, 4 Drawing Sheets

FILTER AND METHOD FOR MANUFACTURING THE FILTER

INCORPORATION BY REFERENCE

The disclosure of Japanese Patent Application No. 2001-71209 filed on Mar. 13, 2001 including the specification, drawings and abstract is incorporated herein by reference in its entirety.

BACKGROUND OF THE INVENTION

1. Field of Invention

The invention relates to a filter formed by spinning fibers that are in a semi-molten state onto a mold, as well as a method for manufacturing the filter.

2. Description of Related Art

As shown in FIGS. 4A and 4B, in order to improve forming efficiency of a filter, semi-molten fibers F spun from a spinning nozzle 54 are deposited onto a forming surface 52f of a forming mold 52 to form a filter 50 having a shape substantially the same as that of the forming surface 52f (Japanese Patent Application Laid-Open Publication No. 8-38834). After being formed, the filter 50 is then removed from the forming mold 52 and completed with a finishing process.

With this method, however, because the filter 50 must be removed from the forming mold 52, careful attention must be paid so as not to damage the filter 50 during removal. That is, although this method simplifies forming the filter 50, removing the filter from the forming mold 52 is troublesome.

SUMMARY OF THE INVENTION

The invention thus simplifies the manufacture of a filter by omitting the process of removing the filter from the mold. According to a first exemplary aspect of the invention, a filter formed by fibers spun in a semi-molten state over a mold is such that the mold is provided as a filter structural member.

According to this exemplary aspect, because the mold for forming the filter becomes a structural member of the filter, there is no need to remove the filter from the mold. Obviating the need for the operation of removing the filter from the mold in this way thus simplifies the manufacture of the filter.

Also according to this exemplary aspect, the mold can include both a filter portion forming surface for forming a filter portion for filtering a fluid and a frame which surrounds this filter portion forming surface. The frame and the like in this case improves the strength of the filter, making the filter less prone to deformation by negative pressure and the like from the fluid passing therethrough.

Fibers protruding outside of the frame can also be folded inward toward the inside of the frame and then fixed thereto. This obviates the need to cut off protruding fibers and keeps the fibers from being wasted.

Moreover, a flange can be formed on the outer periphery of the frame. Doing this enables fibers to be deposited on the flange, which in turn enables a seal portion to be formed easily when the filter is attached to a housing.

The mold and fibers may also be formed of the same material. If formed of the same material, the mold and the fibers in a semi-molten state fuse together, such that adhesion between the mold and fibers is improved. The filter portion forming surface of the mold may also be formed with a mesh.

According to a second exemplary aspect of the invention, a method for manufacturing a filter by spinning fibers in a semi-molten state on a mold, is such that the mold is made a filter structural member after the filter is manufactured. This exemplary aspect of the invention enables the filter according to the first exemplary aspect of the invention to be manufactured.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

Figure 1A:
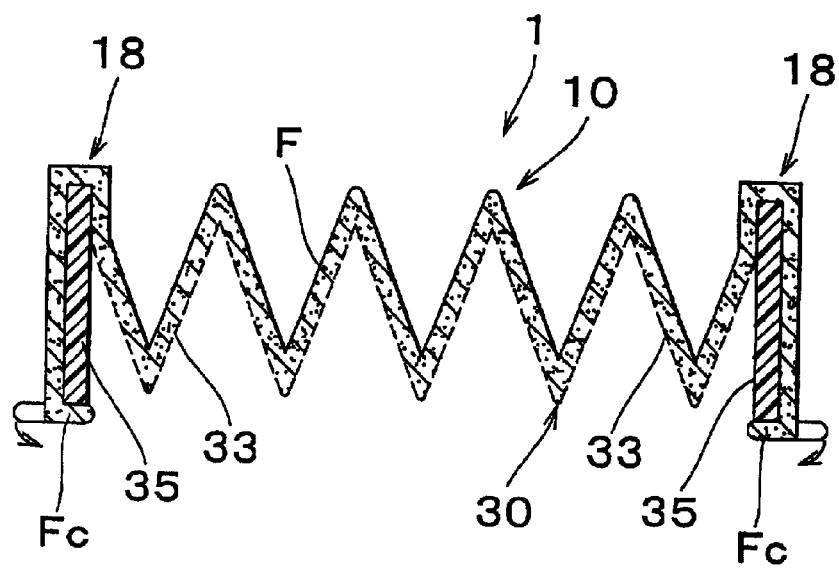
FIG. 1A is a longitudinal sectional view of a filter according to a first embodiment of the invention.
Figure 1B:
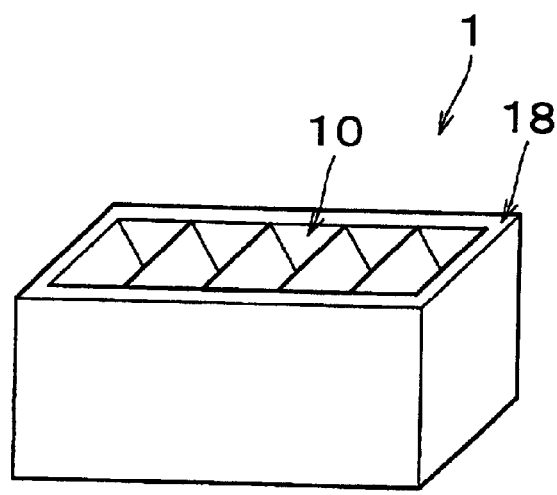
Fig. 1B is a perspective view of the filter according to the same embodiment.
Figure 2A:
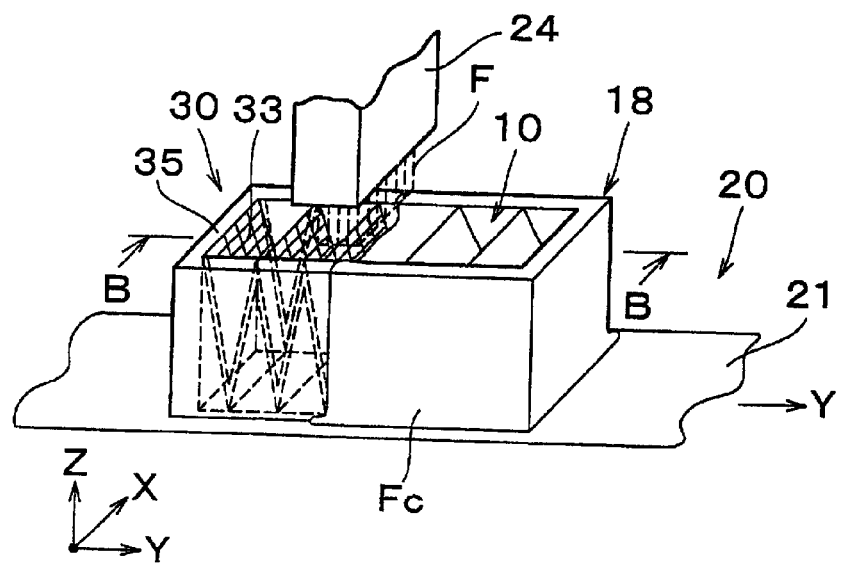
FIG. 2A is a perspective view illustrating a method for manufacturing a filter.

Hereinafter, a filter and a method for manufacturing a filter according to a first exemplary embodiment of the invention will be explained with reference to FIGS. 1 through 3. FIG. 1A is a longitudinal sectional view of a filter according to a first embodiment of the invention, and FIG. 1B is a perspective view of the filter according to the same embodiment. FIG. 2A is a perspective view illustrating a method for manufacturing a filter, and FIG. 2B is a sectional view taken along line IIB—IIB in FIG. 2A.

Figure 2B:
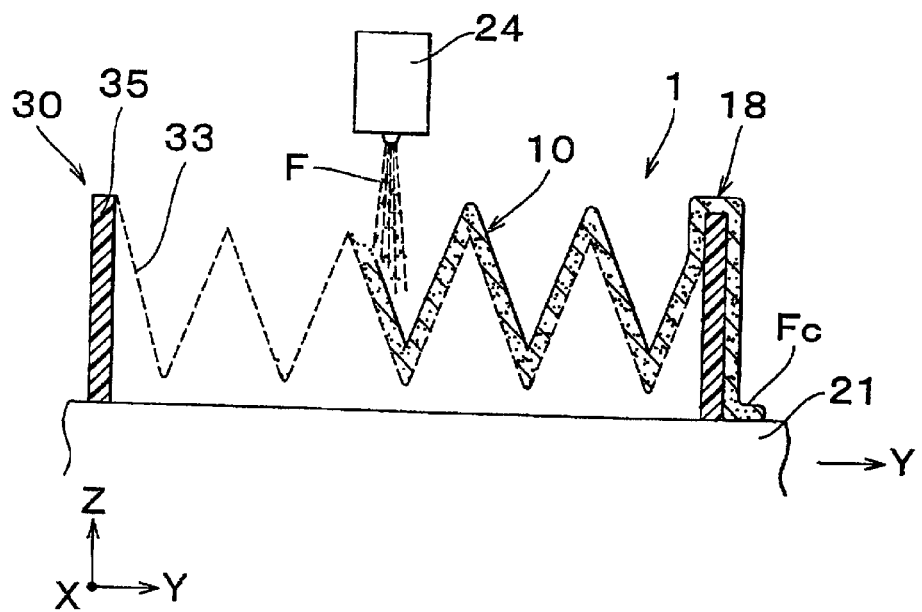
FIG. 2B is a longitudinal sectional view (sectional view taken along line IIB—IIB in FIG. 2A) illustrating the same method of manufacture.
Figure 3:
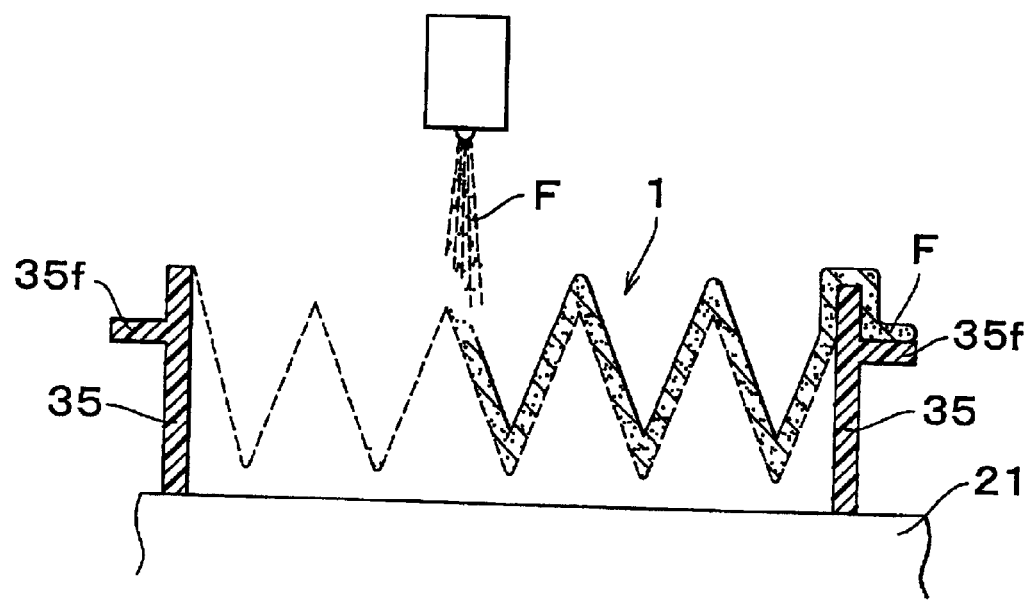
FIG. 3 is a longitudinal sectional view illustrating a modification of a mold portion used in a method for manufacturing a filter.
Figure 4A:
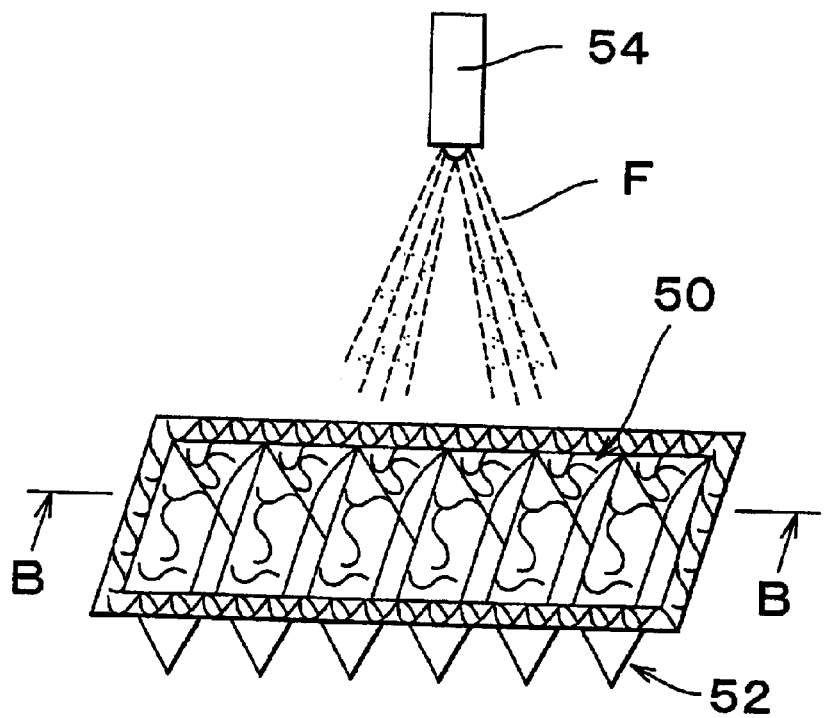
FIG. 4A is a perspective view illustrating a conventional method for manufacturing a filter.
Figure 4B:
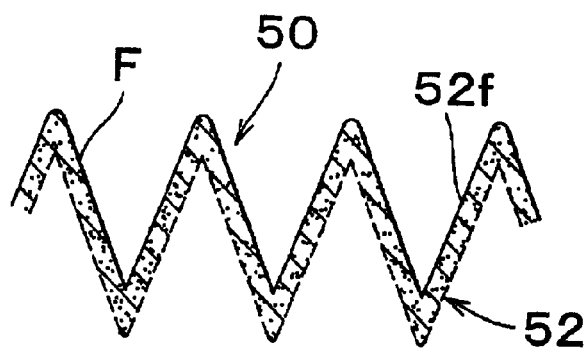
FIG. 4B is a longitudinal sectional view of a main portion in FIG. 4A.

As shown in FIGS. 2A and 2B, a filter 1 according to this exemplary embodiment has a mold portion 30 which is used for forming the filter 1, and which becomes the skeleton of the filter 1 after the filter 1 is formed. A nonwoven fabric F is then deposited at a substantially consistent thickness on this mold portion 30.

The mold portion 30 includes a mesh plate 33 (denoted by the dotted lines) which is formed in a bellows shape, and a rectangular frame 35 for supporting the mesh plate 33 at its periphery. The mesh plate 33 and the frame 35 are formed, for example, of a resin such as polypropylene (PP) or polyethylene terephthalate (PET). The mesh plate 33 is a member which constitutes a filter portion 10 of the filter 1. The dimensions of the mesh eyes of this mesh plate 33 are set as large as possible to reduce the resistance against the fluid passing therethrough. That is, the mesh plate 33 of the mold portion 30 corresponds to the filter portion forming surface of the invention.

The frame 35 is a member which constitutes a peripheral edge portion 18 of the filter 1. The peripheral edge of the mesh plate 33 is welded to the inner peripheral surface of the frame 35, thereby fixing the mesh plate 33 to the frame 35.

As described above, the nonwoven fabric F is deposited at a substantially consistent thickness on the mold portion 30, and as shown in FIG. 1, the filter portion 10 of the filter 1 is formed by this nonwoven fabric F and the mesh plate 33 of the mold portion 30. Further, the peripheral edge portion 18 of the filter 1 is formed by the nonwoven fabric F and the frame 35 of the mold portion 30. A resin, such as polypropylene (PP) or polyethylene terephthalate (PET), that is equivalent to the material of the mold portion 30 is used as the material for the nonwoven fabric F. As shown in Fig. 1A, a nonwoven fabric Fc (shown by the dashed line in the figure) which protrudes outside the frame 35 of the mold portion 30 is folded over toward the inside of the frame 35 and fixed to the bottom end surface thereof Next, the equipment for manufacturing the filter 1 will be described briefly, after which a method for manufacturing the filter 1 using this equipment will be described, referring to FIGS. 2A and 2B.

Filter manufacturing equipment 20 includes a horizontal conveyer 21 upon which a plurality of the mold portions 30 are arranged in sequence (only one mold portion is shown in FIGS. 2A and 2B). In the following description, direction X is the width direction of the conveyer 21, direction Y is the advancing direction of the conveyer 21, and direction Z is the height direction of the conveyer 21.

A spinning nozzle 24 is mounted in a predetermined position above the conveyer 21. This spinning nozzle 24 is a nozzle which uses, for example, the melt blow method, and spins a fiber resin F (hereinafter referred to as "fibers F") ejected from an extruder, not shown, onto the frame 35 and the mesh plate 33 of the mold portion. The fibers F are spun from the spinning nozzle 24 in a semi-molten state and deposited on the mesh plate 33 and frame 35. These fibers F fuse together to create the nonwoven fabric F.

Next, a method for manufacturing the filter 1 will be described. First, while a substantially consistent amount of fibers F are spun from the spinning nozzle 24, the conveyer 21 is driven at a constant speed such that the mold portion 30 is moved at a constant speed underneath the spinning nozzle 24. Accordingly, as shown in FIGS. 2A and 2B, the fibers in a semi-molten state are deposited at a consistent thickness onto the frame 35 and the mesh plate 33 of the mold portion 30 beginning from the end facing the direction Y (the right end in the figure).

The fibers F deposited on the frame 35 and the mesh plate 33 of the mold portion 30 fuse together, becoming the nonwoven fabric F. The filter portion 10 of the filter 1 is then formed by the nonwoven fabric F which is made of the mesh plate 33 of the mold portion 30 and the fibers F deposited on that mesh plate 33. Also, the peripheral edge portion 18 of the filter 1 is formed of the frame 35 of the mold portion 30 and the nonwoven fabric F made of the fibers F deposited on the frame 35 as well as on the outer peripheral surface of that frame 35. As described above, because a resin equivalent to the material of the mold portion 30 is used for the material of the fibers F, when the semi-molten fibers F are deposited on the mold portion 30, the fibers F and the mold portion 30 fuse together, such that the adhesion between the fiber F and the mold portion 30 is enhanced.

In this way, when the filter 1 is formed by depositing the fibers F on the frame 35 and the mesh plate 33 of the mold portion 30, the fiber Fc protruding to the outside of the frame 35 of the mold portion 30 is folded over toward the inside of the frame 35 and fixed to the bottom end surface thereof. Immediately after the fibers F are spun, the fiber Fc is tacky because it has not yet hardened. This allows the fiber Fc to be stuck to the bottom surface of the frame 35 by simply being pressed thereagainst.

According to this exemplary embodiment, because the mold portion 30 used in forming the filter 1 becomes a structural member of the filter 1, there is no need to remove the filter 1 from the mold portion 30. Obviating the need for the operation to remove the filter 1 from the mold portion 30 eliminates concerns over damaging the filter 1 and simplifies manufacture of the filter 1. Moreover, because the mold portion 30 includes the mesh plate 33 for forming the filter portion 10 of the filter 1 and the frame 35 which surrounds the mesh plate 33, the strength of the filter 1 is increased by the mold portion 30. Accordingly, problems such as the negative pressure of the filter portion 10 increasing due to deformation of the filter portion 10 do not occur.

Also, because the fiber Fc (nonwoven fabric Fc) which protrudes outside of the frame 35 of the mold portion 30 is folded in toward the inside of the frame 35 and fixed thereto, the need to cut the protruding fiber Fc off is eliminated such that fiber is not wasted.

In the filter 1 according to this exemplary embodiment, the frame 35 of the mold portion 30 has a rectangular shape. However, according to other exemplary embodiments, a flange 35f may be formed on the outer peripheral surface of the frame 35, as shown in FIG. 3. Providing this flange 35f enables the filter 1 to be fixed to a housing, not shown, using this flange 35f. The fiber F deposited on the flange 35f can also be used, as a seal member.

Further, fusing of the mold portion 30 and the fibers F which are in a semi-molten state, can be even further promoted by preheating the mold portion 30 or by roughly forming the surface of the mold portion 30, when the mold portion 30 is set on the conveyer 21, which is part of the filter manufacturing equipment 20.

Also in the filter 1 according to the present exemplary embodiment, a material (resin) equivalent to the fibers F is used as the material for the mesh plate 33 of the mold portion 30. According to other exemplary embodiments, a material other than resin, such as wire mesh, may also be used.

Alternatively, a plate having slits of constant widths can be used instead of a mesh plate. Also, in the exemplary embodiment described above, a bellows-shaped mesh plate is used to form the filter portion 10 of the filter 1. However, the shape of the mesh plate 33 is not limited to a bellows shape. According to other exemplary embodiments, for example, the longitudinal cross-section of the mesh plate 33 may have the shape of a sine-curve, or the mesh plate may be provided with a plurality of semispherical dents and indents, or the like.

According to the present exemplary embodiment, there is no necessity for an operation to remove the filter from the mold. As a result, manufacturing of the filter is simplified and the filter is prevented from being damaged.

While the invention has been described with reference to preferred embodiments thereof, it is to be understood that the invention is not limited to disclosed embodiments or constructions. On the contrary, the invention is intended to cover various modifications and equivalent arrangements. In addition, while the various elements of the disclosed invention are shown in various combinations and configurations, which are exemplary, other combinations and configurations including more, less or only a single element, are also within the spirit and scope of the invention.

What is claimed is:

1. A filter formed by spinning fiber in a semi-molten state onto a mold, wherein the filter includes the mold as a filter structural member and the mold includes a filter portion forming surface for forming a filter portion for filtering a fluid, and a frame which surrounds the filter portion forming surface.

2. The filter according to claim 1, wherein a fiber protruding outside of the frame is folded in toward an inside of the frame and fixed to the frame.

3. The filter according to claim 1, wherein a flange is formed on an outer peripheral surface of the frame.

4. The filter according to claim 1, wherein the filter portion forming surface and the frame are formed of resin.

5. The filter according to claim 1, wherein the filter portion forming surface is welded to an inner peripheral surface of the frame.

6. A filter comprising:

a mold; and fiber spun in a semi-molten state onto the mold, wherein the mold remains attached to spun fiber and functions as a structural member of the filter and the mold includes a filter portion forming surface for forming a filter portion for filtering a fluid, and a frame which surrounds the filter portion forming surface.

7. A method for manufacturing a filter comprising the steps of:

spinning a fiber in a semi-molten state onto a mold; and maintaining the mold attached to the spun fiber such that the mold functions as a filter structural member of the filter, wherein the mold includes a filter portion on which the fiber is spun, and a frame surrounding the filter portion.

8. The method according to claim 7, further comprising the steps of:

protruding the fiber outside of the frame;

folding the protruding fiber toward an inside of the frame; and fixing the protruding fiber to the frame.

9. The method according to claim 7, wherein a flange is formed on an outer peripheral surface of the frame.

10. The method according to claim 7, wherein the filter portion and the frame are formed of resin.

11. The method according to claim 7, wherein the filter portion is welded to an inner peripheral surface of the frame.

12. The filter according to claim 1, wherein the filter portion forming surface of the mold is formed with a mesh.

* * * * *